Figure 1:
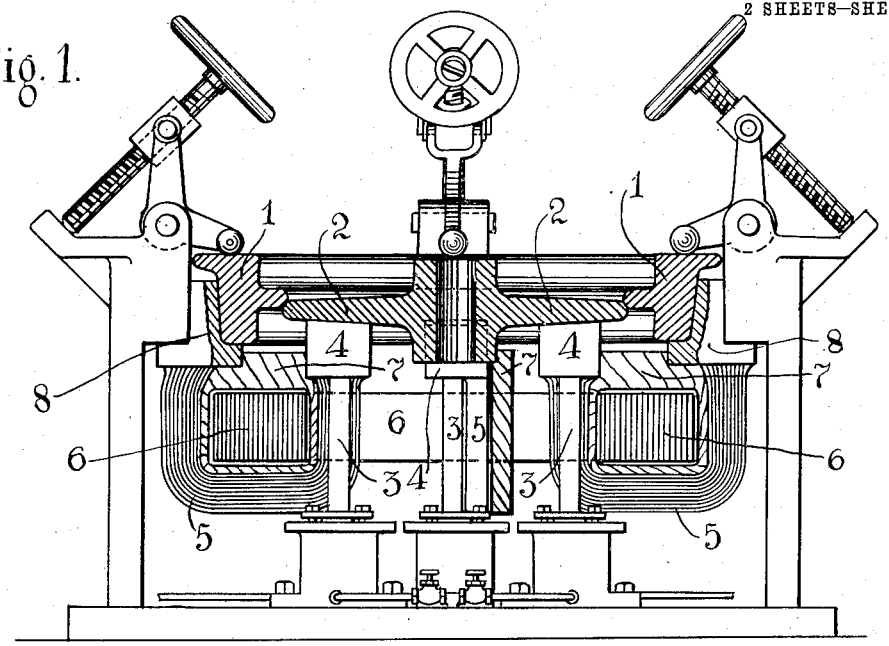

E. THOMSON.
METHOD OF WELDING.
APPLICATION FILED MAR. 14, 1910.

1,076,467.

Patented Oct. 21, 1913.
2 SHEETS—SHEET 1.

Witnesses:

Inventor
Elihu Thomson
By his Attorneys

E. THOMSON.
METHOD OF WELDING.
APPLICATION FILED MAR. 14, 1910.

1,076,467.

Patented Oct. 21, 1913.
2 SHEETS—SHEET 2.

Witnesses:

Inventor
Elihu Thomson
By his Attorneys

UNITED STATES PATENT OFFICE.

ELIHU THOMSON, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

METHOD OF WELDING.

1,076,467.

Specification of Letters Patent.

Patented Oct. 21, 1913.

Application filed March 14, 1910. Serial No. 549,097.

*To all whom it may concern:*

Be it known that I, ELIHU THOMSON, a citizen of the United States, and a resident of Swampscott, in the county of Essex and State of Massachusetts, have invented certain new and useful Improvements in Methods of Welding, of which the following is a specification.

My invention relates to an improved process or method of welding and broadly considered is designed to furnish a method of uniting the component parts of a metal structure by welded joints in those cases where their nature is such that the dimensions must be preserved in the process of welding so that it is not permissible or possible to push the parts together longitudinally as is required in the ordinary process of forming a butt-welded joint by the electric welding process. My invention therefore will be seen to be applicable, among other things, to the union of an endless rim, margin or frame to its center or body or inclosure, in which case, as will be obvious, no movement of one part with relation to the other in the plane of the finished structure to form an ordinary butt-welded joint between them is possible. At the same time it will be readily understood that the invention might be applied to other cases where, in the process of union of the two parts, no longitudinal movement of the component parts should take place for the reason that such movement would change the ultimate dimensions of the finished article. My invention is particularly useful, however, for welding the center or body of a car wheel into its tire or rim and makes it possible to produce a car wheel or locomotive wheel on which the tire shall be of high-grade steel and the center of mild steel, and such that, should the tire section crack, the wheel will still be held together by its union with the center of soft steel.

In constructing a car wheel according to my invention, the tire is made of rolled high-grade steel while the center consists of a mild steel casting.

As will be apparent from the subjoined description, my invention is applicable either to a complete web or disk wheel or to one having spokes.

In describing the improved process of welding, forming the broad invention herein claimed, I will set the same forth in its application to the construction of a car wheel made according to my invention, from which its application to other metal structures formed of a number of parts welded together or to any case of the welding of two pieces of metal together will be readily understood.

Broadly stated, the invention consists in providing the two pieces that are to be welded with suitable projections or in forming them so that when assembled or brought together they will be held laterally displaced from their ultimate position by parts at or near the desired point or points of welded union, assembling them in engagement at such points but laterally displaced, bringing the parts to plastic condition by heating them in any suitable way, preferably by passing a heating electric current through them, and applying lateral pressure to bring them into their proper relative position and at the same time weld them together, said parts being in such operation maintained against longitudinal displacement.

The invention consists further in the particular processes or methods and product more particularly specified in the claims at the end of this description.

In the application of my invention to the union of an endless rim or margin to an inclosure, this longitudinal displacement is prevented by the form of the component part which consists of the endless rim or margin provided the same be stiff enough. In other cases, other or extraneous means may be used for holding the parts against longitudinal displacement during the application of the lateral pressure or in other words against displacement in a line transverse to the line of application of the pressure which moves the parts laterally into the required ultimate position in the structure.

Assuming that my invention is applied to uniting a wheel tire or rim and its center or body, apparatus of a form such as illustrated in the accompanying drawings may be employed.

Figure 2:
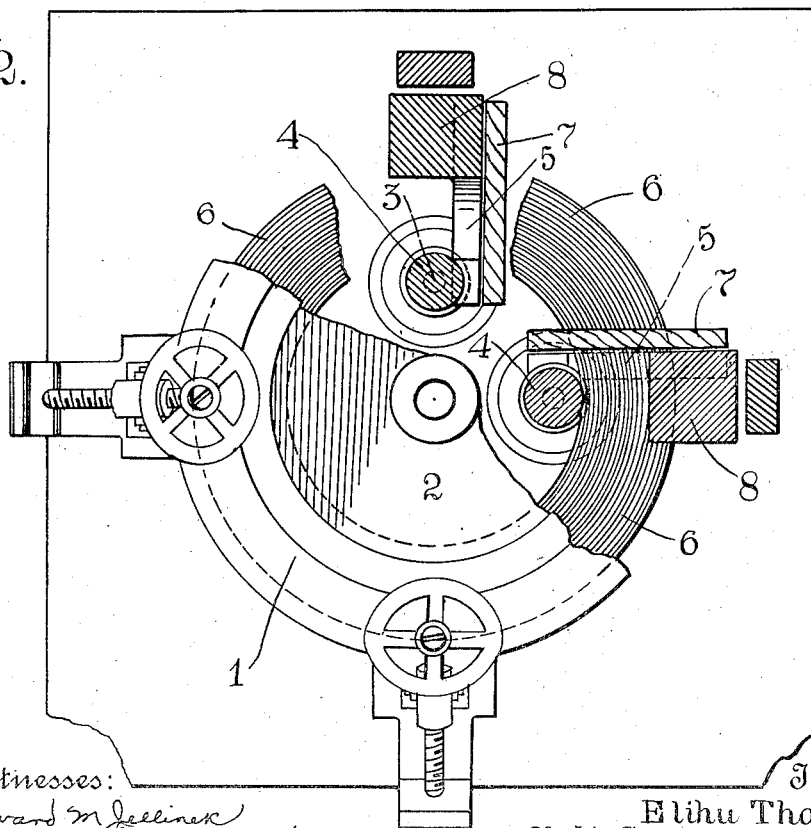
Figure 3:
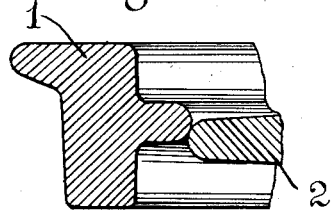
Figure 4:
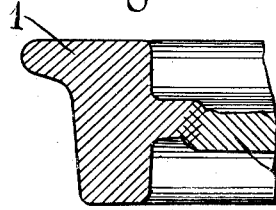
Figure 5:
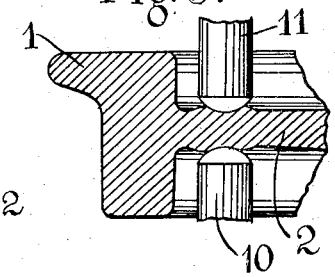
Figure 6:
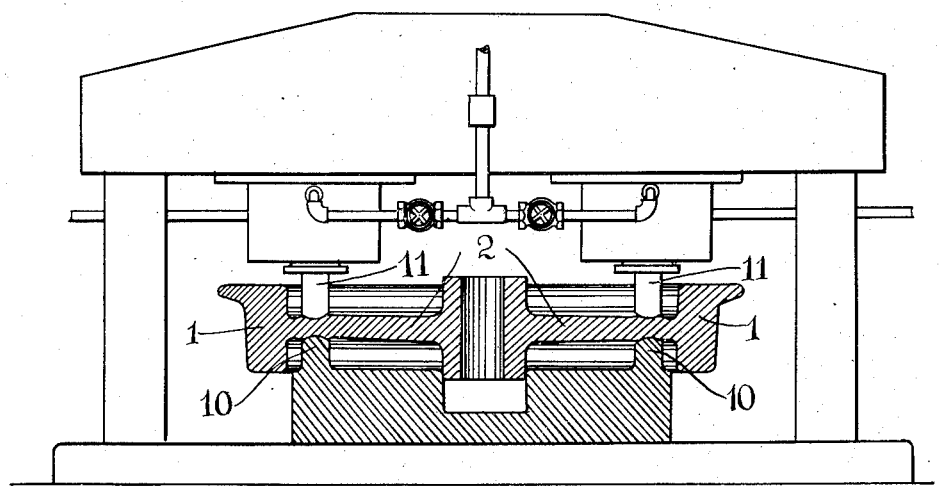
Figure 7:
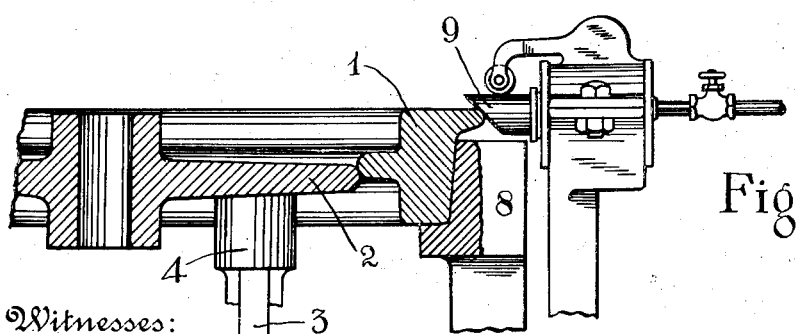

In said drawings Figure 1 is a side elevation and partial vertical central section of said apparatus showing a wheel rim and its center in position in the apparatus preparatory to the performance of the welding operation. Fig. 2 is a plan of such apparatus, parts being broken away and some shown in longitudinal section. Fig. 3 illustrates the form which may be given to the rim and center at their points of engagement preparatory to the welding operation. Fig. 4 shows the center as entered or nearly entered into the rim portion by the welding operation and Fig. 5 shows the manner in which the welded union may be subjected to forging or pressure during the cooling. Fig. 6 shows a vertical section of the welded wheel in the forging machine. Fig. 7 illustrates a modification in the mechanical appliances for holding the rim in position in the apparatus during the welding.

1 is the tire formed by a rolling or other operation with an interior projection which may be continuous or run clear around the interior of the tire and which is preferably rounded or sloping at its side where it is to be engaged by the outer edge of the disk or center 2 of the car wheel. Said disk or center 2 is preferably finished with a hub and its external edge or periphery is also finished preferably with a rounded or sloping outline or side where it is to engage the inside of the rim. The relation of the rim and center when held laterally displaced out of plane with one another by the said rounded projections or sloping outline is shown in Fig. 3 and likewise in Fig. 1 where the rim and center are shown assembled preparatory to the operation of welding them together by lateral pressure or pressure applied transversely to the plane of the finished structure. As shown in this figure, the disk casting or center rests under the tire portion 1 before the application of the welding pressure and is supported in such position preferably by the means employed for applying pressure. Said support may consist of rods 3 connected to and operated by hydraulic pistons arranged around the center and terminating in the supporting blocks 4 of any desired number. When an electric current is used to bring the engaged parts of the rim and center to welding temperature these blocks 4 are preferably copper blocks forming terminals for the flexible secondaries 5 of a welding transformer or transformers, said flexible secondaries belonging preferably to a single circular transformer whose core 6 is an annulus of soft iron.

The rim or tire 1 preferably is supported during the welding operation in an annular or segmental seat or rest 8 into which the tire part 1 preferably fits. Said seat or rest is also preferably so constructed as to hold the part 1 against radial expansion or deformation. This feature of construction of the part which holds the rim is not essential when said rim consists of a very heavy piece of metal as in the case of a car wheel rim, since the latter is ordinarily itself of sufficient rigidity to resist the tendency to expansion due to the crowding of the center into place within it. In the case, however, of rims or other objects or of car wheel rims which may have some degree of flexibility, it is desirable that the rest or holder 8 should be of a construction to hold the rim against such tendency to deformation.

The seat or rest 8 is suitably sustained in the seat or frame of the machine. Suitable clamping devices, as shown, are employed for holding the rim or tire 1 solidly down in its seat and so as to rigidly maintain it in position when the center 2 is forced up by hydraulic pressure into place within the tire or rim. The seat or rest 8, when electric heating is used, is also preferably of copper and forms the other terminal of the transformer, being suitably fastened to the opposite terminals of the flexible secondaries 5. A primary of the transformer is merely indicated at 7. The clamping devices shown in Fig. 1 provide a screw clamping but as indicated in Fig. 7 a small hydraulic ram whose plunger has a sloping head 9 may be employed, said plunger head operating when forced inward to press the tire or rim or part 1 down upon its support and so as to hold the same firmly when the center 2 is forced up into place. Any number of such clamping devices can be arranged around the rim or other part 1. Assuming that the parts are in the position shown, it is evident that if the meeting edges or projections of the rim and disk or center or what have already been described as projections, are softened by heat and an upward pressure is applied to the center 2 while the rim or margin 1 is held down, said center will be forced into position or approximately into position within the rim or tire part. This heating at the projections or meeting portions occurs when the welding or heating electric current is passed over the projections and from the center to the rim from a number of welding transformer secondaries suitably arranged around the whole structure. If the disk is kept cool, and the contacts also, and the operation itself lasts but a short time, the heating is quite local to the meeting parts of the tire and center disk and the joint will appear as on Sheet 2, Fig. 4, Fig. 3 showing the parts before the union has taken place. In such a structure as this, where the dimensions are fixed after welding, so that if contraction by cooling takes place, the web or center would tend to pull away from the tire, it is necessary to prevent this by subjecting the structure after welding to such a manipulation as would spread the metal at the heated portion and cause it to fill during contraction, and in Fig. 6 a machine for doing this immediately after welding and while the parts are hot is shown. The wheel is quickly transferred after welding and while hot to rest on an abutment 10 directly under the welded portion, and above the same is a circular abutment or set of projections 11, driven downward by hydraulic rams or other suitable means; the frame of the structure being extremely strong to stand the pressures. The action of the weld may be compared by examining Figs. 3, 4 and 5. This action is a spreading action of the hot metal at the weld and should be performed while the material is still plastic, and the pressure should be maintained while the heat is being lost; and it is well too, that the pressure be greatly increased as the metal gets cool.

My invention is not limited wholly to wheels but may be applied to any structure where it is necessary to preserve dimensions and where there is no opportunity of pushing the pieces together longitudinally, so to speak, that is, it is adapted to producing structures to given dimensions and by using as the metal for the weld metal obtained by a lateral squeezing up, by which, owing to the rigid maintenance of the part 1 in position so that it will not yield longitudinally, there will result a weld which is, so to speak, a combination of lap and butt weld.

What I claim as my invention is:

1. The method of uniting a metal rim or margin and its metal inclosure by so forming the edges at the points of union that when engaged they will be laterally displaced from the position they occupy with relation to one another in the finished structure, bringing them into edgewise engagement at such points, passing a heating electric current to bring the portions thereof to plastic condition at the points where they are engaged and applying lateral pressure to move the parts out of their position of relative lateral displacement toward the position they occupy in the finished structure.

2. The method of welding two pieces of metal together, consisting in so forming the edges at the points of proposed union that they may be held laterally displaced from the position they occupy with relation to one another in the finished structure when brought into engagement, bringing the two pieces into edgewise engagement at such points, passing an electric current from one to the other to heat the proposed point of union and applying lateral pressure to force the parts toward the position they are intended to occupy in the finished structure, said parts being held during the operation against displacement longitudinally or in the line of the joint.

3. The method of uniting a wheel rim and its body or center, consisting in providing them respectively with internal and external projections located in the plane of the parts and adapted to hold them laterally displaced by an edgewise engagement of said projections, passing an electric current from one to the other while they are engaged and laterally displaced and applying lateral pressure to enter the body or center within the rim.

4. The method of uniting a metal rim or margin and its metal inclosure by forcing them laterally towards position where they will be in plane with one another while they are laterally displaced by the engagement of their inner and outer edges respectively and while heated to plasticity at such points of engagement.

5. The method of uniting an endless metal rim and its metal inclosure by bringing the inside of the rim and the outer edge of the inclosure into edgewise engagement laterally, passing a heating electric current across the points of engagement to bring the parts to plastic condition and forcing the inclosure laterally into position within the rim.

6. The method of securing a wheel rim to its center or body by bringing the inner edge of the rim and the outer edge of the center into lateral edgewise engagement by projections having sloping or rounded surfaces, passing a heating electric current from one to the other across the points of engagement to bring the parts to plasticity and applying lateral pressure to enter the center or body within the rim and weld the two together.

7. The method of constructing a car wheel with a high-grade steel rim or tire, consisting in providing a rolled high-grade steel rim and casting or center of mild steel, said tire and center being provided with internal and external projections respectively, located in the plane of the parts and adapted to hold them temporarily in position of lateral displacement by an edgewise engagement of said projections, assembling the rim and center with their projections engaged laterally, passing a heating electric current from the rim to the center to bring such projections to plasticity and applying lateral pressure to force or crowd the center into position within the rim and at the same time weld the two together.

8. The method of constructing a car wheel with a high-grade steel rim or tire, consisting in providing a rolled-high-grade steel rim and casting or center of mild steel, said tire and center being provided with internal and external projections respectively, adapted to hold them temporarily in position of lateral displacement by an edgewise engagement of said projections, assembling the rim and center with their projections engaged laterally, heating the projections to bring them to plasticity and applying lateral pressure to force or crowd the center into position within the rim and at the same time weld the two together.

9. The method of electric welding, which consists in preparing the parts to be welded so that when engaged at the points of proposed union they will be held lateraly displaced from the plane they occupy in the finished work, passing an electric current across the point of engagement and applying lateral pressure while the parts are held from longitudinal displacement to bring them into proper position laterally with respect to one another and at the same time weld them together.

10. The method of welding two pieces of metal together in their final welded position in the finished structure by forming pieces to desired dimensions but with parts adapted to engage at the points of desired union and hold them laterally displaced from final position, bringing the prepared parts into engagement while in relatively displaced position laterally, passing an electric current from one to the other and applying pressure to bring the parts into relative finished position and while they are held from longitudinal displacement, so as to complete the structure and weld its parts together without change of dimension in the line of the joint.

11. The method of electrically welding two pieces of metal together, consisting in forming the parts at the point of desired union so that they will be displaced from alinement with one another when engaged laterally, assembling them in position but laterally displaced, passing a heating electric current across the surfaces engaged to heat the parts to plasticity and applying lateral pressure to bring the two parts into alinement, while at the same time holding them from relative movement longitudinally in the line of the joint.

12. The method of fixing a rim to its inclosure, consisting in forming them at the point of desired union in such manner that they will engage each other by their edges while displaced laterally, assembling them in engagement, passing an electric current across the point of engagement and applying lateral pressure to enter the inclosure by a lateral or sidewise movement into the rim and at the same time weld the inclosure and its rim together.

13. The method of joining a wheel tire or rim and a disk center by so forming the edge of the disk and the interior of the rim or tire that the center will be held from entering the rim laterally by the engagement of the edge of one with the edge of the other, passing an electric current across the points of engagement to soften the metal, applying pressure to push or crowd the center within the rim by a movement transverse to the plane of the wheel to cause the parts to be welded together and at the same time enter the center within the rim and subsequently, during cooling, subjecting the plastic metal to pressure to spread it out while the heat is being dissipated.

14. The method of joining a wheel tire or rim and a disk center by so forming the edge of the disk and the interior of the rim or tire that the center will be held from entering the rim laterally by the engagement of the edge of one with the edge of the other, heating the points of engagement to soften the metal, applying pressure to push or crowd the center within the rim by a movement transverse to the plane of the wheel to cause the parts to be welded together and at the same time enter the center within the rim and subsequently, during cooling, subjecting the plastic metal to pressure to spread it out while the heat is being dissipated.

Signed at Lynn in the county of Essex and State of Massachusetts this 11th day of March A. D. 1910.

ELIHU THOMSON.

Witnesses:
    JOHN A. MCMANUS, Jr.,
    ROBERT SHAND.